(12) United States Patent
Deschamps et al.

(10) Patent No.: US 9,108,385 B2
(45) Date of Patent: Aug. 18, 2015

(54) HONEYCOMB CORE STRUCTURE FOR USE IN A STRUCTURAL PANEL FOR A JET ENGINE NACELLE

(75) Inventors: Thierry Deschamps, Heuqueville (FR); Bertrand Desjoyeaux, Saint Adresse (FR); John Moutier, Le Havre (FR)

(73) Assignee: AIRCELLE, Gonfreville l'Orcher (FR)

( * ) Notice: Subject to any disclaimer, the term of this patent is extended or adjusted under 35 U.S.C. 154(b) by 1047 days.

(21) Appl. No.: 13/147,937

(22) PCT Filed: Jan. 27, 2010

(86) PCT No.: PCT/FR2010/000068
§ 371 (c)(1),
(2), (4) Date: Aug. 4, 2011

(87) PCT Pub. No.: WO2010/089473
PCT Pub. Date: Aug. 12, 2010

(65) Prior Publication Data
US 2011/0293411 A1  Dec. 1, 2011

(30) Foreign Application Priority Data
Feb. 5, 2009  (FR) ..................... 09 00499

(51) Int. Cl.
*B23P 15/00*  (2006.01)
*B23P 17/00*  (2006.01)
(Continued)

(52) U.S. Cl.
CPC . *B32B 3/12* (2013.01); *B21D 28/32* (2013.01); *B32B 3/18* (2013.01); *B32B 37/0076* (2013.01);
(Continued)

(58) Field of Classification Search
CPC .... B21D 19/088; B21D 28/26; B21D 39/025; B21D 39/034; B26F 2001/365; B21J 15/046; B21J 15/383
USPC ........................................ 29/890.13
See application file for complete search history.

(56) References Cited

U.S. PATENT DOCUMENTS 430,000 A  *  6/1890  Clark et al. ............... 29/509
3,256,649 A  *  6/1966  Webb ..................... 428/116
(Continued)

FOREIGN PATENT DOCUMENTS

EP  0798107 A2  10/1997
EP  1889713 A2  2/2008
(Continued)

OTHER PUBLICATIONS

International Search Report PCT/FR2010/000068; Jun. 9, 2010.

*Primary Examiner* — David Sample
*Assistant Examiner* — Nicholas W Jordan
(74) *Attorney, Agent, or Firm* — Brinks Gilson & Lione

(57) ABSTRACT

The invention relates to a honeycomb core structure (202) for use in a structural panel for a jet engine nacelle, comprising at least one block with a honeycomb core (A, B) having a central part (5a, 5b) with core honeycomb cells (7a, 7b) and at least two lateral parts (9a, 9b) each comprising a number of honeycomb joining cells (11a, 11 b) of which at least one part of the honeycomb joining cells (11a, 11 b) has at least one additional wall (201a, 201 b) to form a join, the honeycomb core block(s) (A, B) being connected by at least one joint zone (213) formed by punching two additional walls (201a, 201b) superimposed one or the other and provided by honeycomb joining cells (11a, 11 b) belonging to the distinct lateral parts (9a, 9b). The invention further relates to a structural panel and a nacelle comprising such a structure (202) and a method for producing such a structure (202).

13 Claims, 2 Drawing Sheets

(51) Int. Cl.
| | |
|---|---|
| *B32B 3/12* | (2006.01) |
| *B32B 37/00* | (2006.01) |
| *B42B 5/02* | (2006.01) |
| *B21D 28/32* | (2006.01) |
| *B32B 38/04* | (2006.01) |
| *B32B 3/18* | (2006.01) |
| *F02K 1/82* | (2006.01) |
| *G10K 11/172* | (2006.01) |

(52) U.S. Cl.
CPC . *B32B 38/04* (2013.01); *B42B 5/02* (2013.01); *F02K 1/827* (2013.01); *G10K 11/172* (2013.01); *B32B 2037/0092* (2013.01); *B32B 2038/042* (2013.01); *Y02T 50/672* (2013.01); *Y10T 29/49346* (2015.01); *Y10T 428/24149* (2015.01)

(56) References Cited

U.S. PATENT DOCUMENTS

| | | | | |
|---|---|---|---|---|
| 5,022,253 | A | * | 6/1991 | Parlatore .......................... 72/325 |
| 5,720,144 | A | * | 2/1998 | Knudson et al. ................. 29/416 |
| 5,938,875 | A | * | 8/1999 | Jessup et al. .................... 156/252 |
| 2003/0070276 | A1 | * | 4/2003 | Raines ........................ 29/432.1 |
| 2010/0108435 | A1 | * | 5/2010 | Valleroy et al. ............... 181/214 |

FOREIGN PATENT DOCUMENTS

| | | |
|---|---|---|
| WO | 2007137607 A1 | 12/2007 |
| WO | 2008113904 A2 | 9/2008 |

* cited by examiner

HONEYCOMB CORE STRUCTURE FOR USE IN A STRUCTURAL PANEL FOR A JET ENGINE NACELLE

TECHNICAL FIELD

The present invention relates to a honeycomb core structure for use in a structural panel for a jet engine nacelle.

The invention also relates to a panel and a nacelle including such a honeycomb core structure and a method for manufacturing such a structure.

BACKGROUND

Airplane turbojet engines are surrounded by a nacelle to protect them and ensure the operation thereof. The nacelle is made up of walls composed of non-structural panels and structural panels. The latter parts ensure a sufficient stiffness of the nacelle. To that end, structural panels usually have one or more layers of cellular core structures (commonly called "honeycomb" structures). These layers are generally covered with a skin on their so-called outer face, i.e. the face radially furthest from the axis of the engine, and on their inner face, i.e. the face radially closest to the axis of the engine.

The structural panel is then assembled by arranging the different skins and layers, which are then pasted on a mold with the required shape. The assembly is cured in a furnace so as to grip the layers and polymerize the adhesives.

In parallel, turbojet engines generate substantial noise pollution. There is therefore a strong demand aiming to reduce this pollution, and even more so given that the turbojet engines used are becoming increasingly powerful.

To that end, some of the panels used are acoustic structural panels whereof the layers are generally covered on the outer face with an air-impermeable skin, called "solid," and on the inner face with an air-permeable perforated skin, called "acoustic."

The structural acoustic panel can also comprise several layers of cellular core structures between which a multi-perforated skin, called a "septum," is located. This skin is adhered between the honeycomb core structures by heating during the assembly/gluing phase of the panel.

Such panels constitute acoustic resonators able to "trap" the noise and therefore attenuate the sound emissions towards the outside of the nacelle.

In a known manner, a honeycomb core structure comprises at least one honeycomb core block comprising a central part having core honeycomb cells and two lateral parts each having a plurality of honeycomb joining cells.

The acoustic properties of the acoustic structural panel, i.e. its noise absorption rate as a function of the frequency and sound level of the noise, depend in particular on the joining of the honeycomb core block(s).

The join of the cellular joining cells is commonly done using a foaming adhesive, such as the FM410® adhesive, which has a significant expansion capacity. The adjacent edges of the honeycomb core block(s) are coated with the adhesive, which, when it expands, blocks the honeycomb cells by creating overthicknesses.

The use of adhesive requires too long a placement and cutout time of the overthicknesses from an industrial perspective.

Furthermore, these overthicknesses have the drawback of decreasing the effective acoustic surface of the honeycomb core structure as well as causing abrupt impedance interruptions, which contributes to decreasing the acoustic performance of the acoustic panel during the operation of the turbojet engine.

Also known, from application EP 1 889 713, is a honeycomb core structure whereof the honeycomb joining cells have an additional joining wall. By definition, a "honeycomb joining wall" is not engaged in the formation of the honeycomb cell. The joining is done by superimposing the additional joining walls of the honeycomb joining cells belonging to two distinct joint zones and twisting said two additional joining walls thus superimposed in a spiral.

However, such a honeycomb core structure is complex to make.

BRIEF SUMMARY

One aim of the present invention is therefore to provide a honeycomb core structure having a joint zone that is simple to make and effective.

To that end, according to a first aspect, the invention relates to a honeycomb core structure for use in a structural panel for a jet engine nacelle, comprising at least one block with a honeycomb core having a central part with core honeycomb cells and at least two lateral parts each comprising a number of honeycomb joining cells of which at least one part of the honeycomb joining cells has at least one additional wall to form a join, characterized in that the honeycomb core block(s) are connected by at least one joint zone formed by punching two additional walls superimposed one on the other and provided by honeycomb joining cells belonging to the distinct lateral parts.

The inventive structure includes at least one joint zone formed by punching two additional walls superimposed one on the other and provided by honeycomb joining cells belonging to the distinct lateral parts. As a result, the joint zone is easy to implement because it comprises punching two walls of two honeycomb joining cells. The production time for such a structure is also reduced relative to the prior art, the inventive structure not requiring finishing, such as cutting out.

Furthermore, joining by punching as done in the invention ensures an effective connection of said structure while allowing mass savings on a panel including the inventive structure.

From an acoustic perspective, the join to form a structure according to the invention does not require the use of adhesive or any other material obstructing the honeycomb cells. As a result, impedance ruptures at the joint zone are reduced or even eliminated when these panels have an acoustic function to perform.

The joining by punching according to the invention also makes it possible not to have an impact on the integrity of the honeycomb cells and therefore on the structural capacity of the resulting honeycomb core structure.

Furthermore, such a join can be implemented for honeycomb core structures made up of honeycomb core blocks composed of honeycomb cells of different sizes and shapes.

According to other features of the invention, the inventive structure includes one or more of the following optional features considered alone or according to all possible combinations:

- the additional wall(s) are unfolded, which makes punching easier,
- the length of the additional wall(s) is larger than the diameter of the punching and smaller than or equal to the length of the side of a honeycomb cell of the honeycomb core, the honeycomb joining and core cells are made from metal, an alloy, or a composite material that makes it possible to manufacture the honeycomb core and joining cells, the inventive structure includes a plurality of blocks with a honeycomb core defining a plurality of joint zones, which makes it possible to adapt the structural panel to the desired mechanical strength and, if applicable, the desired acoustics, the inventive structure has a single honeycomb core block joined thereon, which makes it possible to save production time.

According to a second aspect, the invention relates to a structural panel characterized in that it includes a structure according to the invention.

Preferably, the inventive panel is an acoustic panel.

According to a third aspect, the invention relates to a nacelle characterized in that it includes a panel according to the invention.

According to another aspect, the invention relates to a method for making a honeycomb core structure according to the invention, characterized in that it includes the following steps:

A—at least one additional wall is formed on lateral honeycomb cells of at least one block with a honeycomb core defining two lateral parts surrounding a central part;

B—the additional walls are at least partially superimposed on the honeycomb joining cells belonging to two separate lateral parts;

C—the honeycomb core block(s) are joined by punching the additional walls thus superimposed via a punching means to form the honeycomb core structure.

According to one preferred embodiment, in step A, the additional wall(s) are formed by cutting, substantially crosswise, a block with a honeycomb core whereof the honeycomb cells are expanded.

According to one preferred alternative, in step B, the additional walls are superimposed when the honeycomb joining and/or core cells are not expanded.

According to another preferred alternative, in step C, the punching means is eyeletting pliers.

BRIEF DESCRIPTION OF THE DRAWINGS

The invention will be better understood upon reading the following non-limiting description, done in reference to the appended figures.

DETAILED DESCRIPTION

Figure 1:
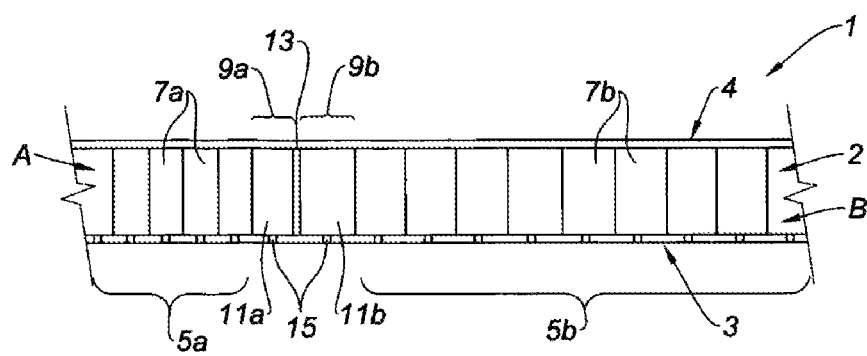
FIG. 1 is a cross-sectional view of a single-layer structural panel according to the present invention.

As shown in FIG. 1, a structural panel 1 according to the invention of the single-layer acoustic panel type comprises a honeycomb core structure 2 according to the invention made up of one or more, and in this case two, blocks with a honeycomb core A and B joined together. In the event the inventive structure 2 has a plurality of blocks with a honeycomb core A, B defining a plurality of joint zones, it is then possible to adapt the structural panel 1 according to the invention to the desired mechanical strength and also, if applicable, the desired acoustic absorption. According to one preferred embodiment, the inventive structure includes a single block with a honeycomb core joined thereon. In this way, a single connecting zone is obtained, which makes it possible to save time during the production of the inventive structure.

The honeycomb core structure 2 is sandwiched between an inner skin 3 and an outer skin 4.

These two blocks with a honeycomb core A, B include a central part 5 comprising core honeycomb cells 7a, 7b and typically several, in this case two lateral parts 9a, 9b each comprising a plurality of honeycomb joining cells 11a, 11b. The honeycomb joining cells 11a, 11b of each block A and B are connected to each other so as to form a joint zone 13, the features of which will be detailed below.

A block can have any geometric shape, including a substantially square or oval shape. The lateral part(s) are arranged between the edge of said block or central part. Thus, in the case of a substantially square or rectangular shape, said block can have up to four side walls. In general, the joint zone between a plurality of blocks can be made on some or all of the edges of said block.

Figure 3:
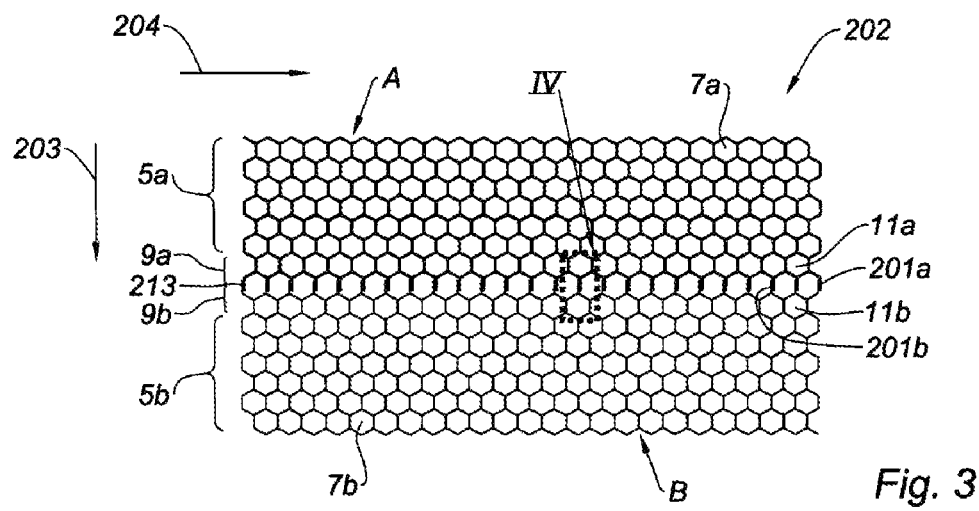
FIG. 3 is a top view of a structure according to the invention.
Figure 4:
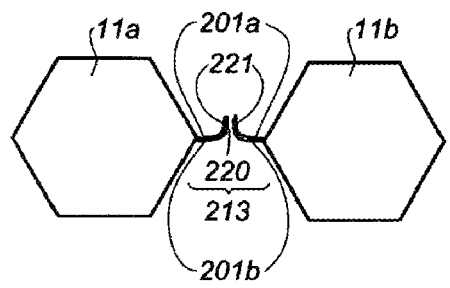
FIG. 4 is an enlargement of zone IV of FIG. 3.

As shown in FIGS. 3 and 4, the core honeycomb cells 7a, 7b and the honeycomb joining cells 11a, 11b in this case have hexagonal sections, thereby forming so-called honeycomb structures. It is possible for the honeycomb cells 7a, 7b and 11a, 11b to have sections of any geometric shape other than hexagonal. When the honeycomb cells 7a, 7b and 11a, 11b thus form so-called honeycomb structures irrespective of the shape of the section, said honeycomb cells 7a, 7b and 11a, 11b are said to be "expanded." When said cells 7a, 7b and 11a, 11b are in sheet form, i.e. not in honeycomb form, said honeycomb cells 7a, 7b and 11a, 11b are said to be "not expanded."

As shown in FIG. 1, the section of the core honeycomb cells 7a and joining cells 11a of the block A can for example be smaller than that of the core honeycomb cells 7b and joining cells 11b of block B, so as to meet the acoustic and/or mechanical constraints imposed by the manufacturer's specifications.

Preferably, the honeycomb joining cells 11a, 11b and core cells 7a, 7b are made of metal, an alloy, or a composite material so as to facilitate the manufacture of the core honeycomb cells 7a, 7b and joining cells 11a, 11b and to impart good strength to the latter. The material making up the inner skin 3 can be made from a metal material such as aluminum or titanium, or fabric, and the material making up the outer skin 4 can be a multi-layer composite material or a metal material such as aluminum or titanium.

The structural panel 1 as shown in FIG. 1 is an acoustic panel. In this case, the inner skin 3 includes perforations 15 situated opposite the core honeycomb cells 7a, 7b and joining cells 11a, 11b. In this way, the structural panel 1 is intended to absorb the sound annoyance created by the operation of the turbojet engine.

Figure 2:
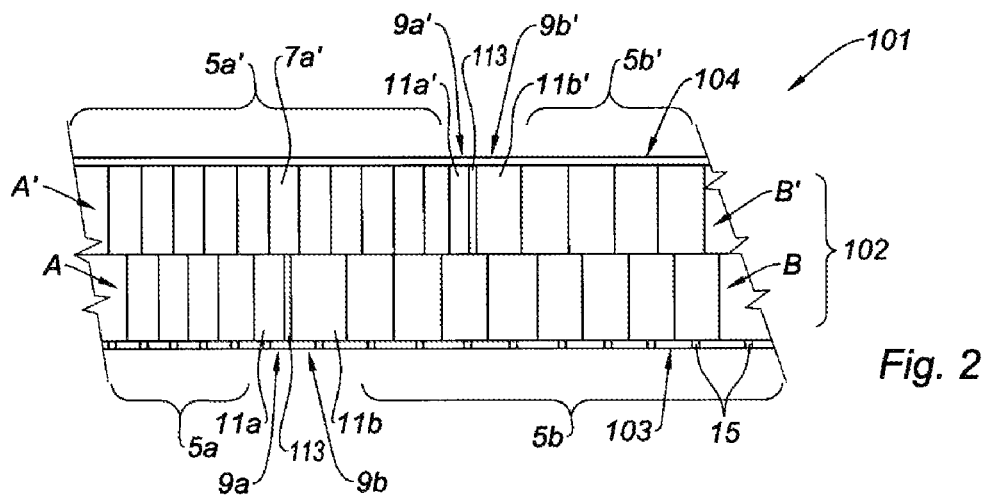
FIG. 2 is a cross-sectional view of a dual-layer structural panel according to the present invention.

In an alternative shown in FIG. 2, the structural panel 101 is a dual-layer panel according to the invention comprising two layers of blocks with a cellular core, respectively made up of blocks A, B and A', B'. Said layers are assembled together using known means and sandwiched between an inner skin 103 and an outer skin 104 similar to those of FIG. 1. The other elements making up the structural skin 101 are identical to those of the structural panel 1 shown in FIG. 1, the corresponding references being the same.

According to one alternative, it is possible to obtain a structural panel including a number of layers of honeycomb core blocks greater than 2, in particular greater than or equal to 3.

In this dual-layer panel, the honeycomb core blocks A, B on the one hand, and A', B' on the other are joined together in one or more joint zones 113.

The operating principle of an acoustic panel like those 1 and 101 shown in FIGS. 1 and 2 is known in itself; the panel 1, 101 is intended to be mounted in the inner wall of an aircraft nacelle so that the inner skin 3, 103 is located opposite the engine located in said nacelle.

The noise emitted by this engine penetrates the honeycomb cells A, B via orifices 15 situated in the inner skin 3, 103, and vibrates inside these core honeycomb cells 7a, 7b and joining cells 11a, 11b that make up the acoustic resonators, thereby making it possible to dissipate the acoustic energy and enabling a subsequent reduction of the noise level. In order to improve the acoustic absorption, it is possible to apply a perforated skin, also called septum, between the two layers of blocks with a honeycomb core A, B and A', B' of the structural panel 101 so that the core honeycomb cells 7a', 7b' and joining cells 11a', 11b' of the blocks A' and B' also make up acoustic resonators.

As shown in FIGS. 3 and 4, in the inventive structure 202, the honeycomb joining cells 11a and 11b have at least one additional wall 201a and 201b able to form a join 213.

The honeycomb core block(s) A and A are connected by at least one joint zone 213 formed by punching two additional walls 201a and 201b superimposed one on the other and coming from honeycomb joining cells 11a and 11b belonging to distinct lateral parts 9a and 9b (see FIGS. 3 and 4). The punching used in the context of the present invention makes it possible to leave a cavity at this joint zone.

The punching can be done at any angle used relative to the additional walls 201a and 201b substantially superimposed on each other provided that said angle is adapted to allow effective punching of the additional walls 201a and 201b. In the embodiment shown in FIGS. 3 and 4, the punching angle relative to the substantially superimposed additional walls 201a and 201b is substantially equal to 90°.

According to one preferred embodiment, the additional wall(s) 201a and 201b are unfolded so as to obtain good overlapping thereof. In this way, one improves and facilitates the punching.

According to one alternative, the additional wall(s) 201a and 201b are not unfolded, in particular when said walls are formed in the "ribbon" direction 203, corresponding to the orientation of the honeycomb core block A, B before expansion (see FIG. 3). The direction of "expansion" 204 corresponds to a direction perpendicular to the direction of the ribbon 203 (see FIG. 3). The "expansion" direction 204 makes it possible to typically form honeycomb cells 7a, 7b and 11a, 11b said to be "expanded," i.e. the honeycomb structure.

The additional wall(s) 201a and 201b are substantially planar or slightly curved.

Preferably, the length of the additional wall(s) 201a and 201b is larger than the punching diameter and smaller than or equal to the length of the side of a honeycomb cell of the honeycomb core. The length of the additional walls can be substantially identical or different.

FIGS. 3 and 4 show an embodiment in which the punching is done on two honeycomb core blocks A and B having a particular configuration. In particular, the additional walls 201a and 201b are mounted on an edge of the hexagon formed by the honeycomb joining cell 11a, 11b. According to one alternative, the additional wall 201a and 201b can be arranged on one side of the honeycomb joining cell 11a, 11b or on an edge thereof. According to another embodiment, a honeycomb cell has two additional walls 201a, 201b, or more.

Figure 5:
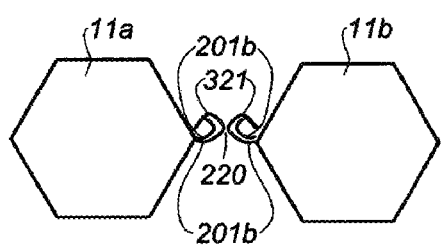
FIGS. 5 to 7 are alternatives of the embodiment of FIG. 4.

In the embodiment shown in FIG. 4, the punched additional walls 201a and 201b have an orifice 220 pierced by the punch surrounded by a perimeter 221. In the case of FIG. 4, the perimeter 221 is substantially in the shape of a funnel. Such a perimeter 221 can be obtained by a punch known by those skilled in the art. The perimeter can be more or less folded on itself so as to form a hook 321, as shown in FIG. 5. Such a curved perimeter 321 is for example obtained with a punch associated with an additional tip making it possible to curve the perimeter 221. The presence of a curved perimeter as shown in FIG. 5 improves the better mechanical strength of the joint zone.

Figure 6:
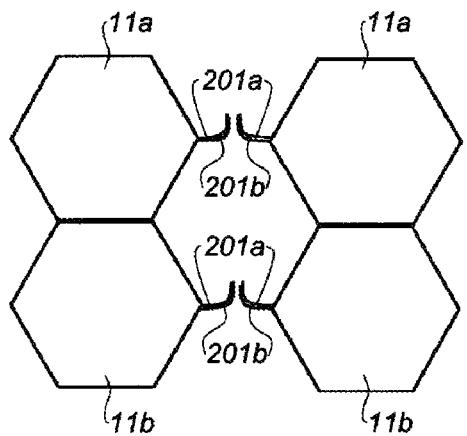

The covering direction of the additional walls 201a and 201b can be regular. Thus, regularly, the additional wall 201b belonging to the honeycomb joining cell 11b belonging to one of the blocks B can systematically at least partially cover the additional wall 201a belonging to the honeycomb joining cell 11a belonging to the other block A (see FIG. 3). According to one alternative, the additional wall 201b substantially covers the additional wall 201a then, alternatively, the additional wall 201a substantially covers the additional wall 201b. According to still another alternative, the covering direction by an additional wall is not regular (see FIG. 6).

Figure 7:
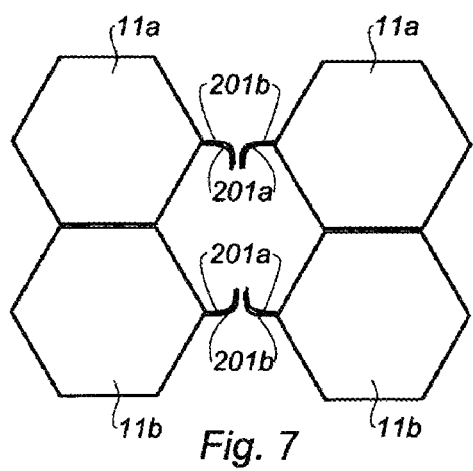

Moreover, the punching can be done in a single direction, alternating in one direction then the other, or in one direction and then other irregularly (see FIG. 7).

According to another aspect of the invention, the method for manufacturing the honeycomb core structure 2, 102 and 202 is obtained by a production method including the following steps:

A—at least one additional wall 201a, 201b is formed on lateral honeycomb cells 11a, 11b of at least one block with a honeycomb core A, B defining two lateral parts 9a, 9b surrounding a central part 5a, 5b;

B—the additional walls 201a, 201b are at least partially superimposed on the honeycomb joining cells 11a and 11b belonging to two separate lateral parts 9a and 9b;

C—the honeycomb core block(s) A, B are joined by punching the additional walls 201a, 201b thus superimposed via a punching means to form the honeycomb core structure according to the invention 2, 102 and 202.

According to one preferred embodiment, in step A, the additional wall(s) 201a, 201b are formed substantially cutting, crosswise, a block with a honeycomb core A, B, the honeycomb joining 11a, 11b and/or core 7a, 7b cells of which are expanded, i.e. the walls have been substantially stretched so as to form a honeycomb structure. In one alternative, the additional walls 201a and 201b are fastened on the joining cells 11a, 11b, whether they are expanded or not. According to still another alternative, the additional walls 201a and 201b are formed during the formation of the honeycomb joining cells 11a and 11b and irrespective of whether the latter are expanded.

According to another embodiment, in step B, the additional walls 201a, 201b are superimposed when the honeycomb joining cells 11a, 11b and/or core cells 7a, 7b are not expanded. The superposition can be done manually or automatically.

According to one embodiment, in step C, the punching means is eyeletting pliers.

The method according to the invention can also comprise an additional step D in which the structural panel according to the invention is formed by applying and fastening an inner skin 3, 103, perforated or not, and an outer skin 4, 104, to the inventive structure 2, 102 and 202. The fastening can be done using any means known by those skilled in the art, in particular by adhesion. It may be possible to superimpose two identical or different structures 2, 102, 202 before proceeding to step D. In this case, it is possible to apply and fasten a septum between the two structures according to the invention thus superimposed. The fastening can be done using any means known by those skilled in the art, in particular by adhesion.

The invention claimed is:

1. A honeycomb core structure for use in a structural panel for a jet engine nacelle, comprising:
   at least one honeycomb core block with a honeycomb core having a central part with core honeycomb cells; and
   at least two lateral parts each comprising a number of honeycomb joining cells of which, maintaining a closed cell form, at least one part of the honeycomb joining cells has at least one additional wall to form a join,
   wherein the honeycomb core block(s) are rigidly connected by at least one joint zone formed by two additional walls superimposed and punched on each other, and provided by the honeycomb joining cells belonging to distinct lateral parts.

2. The structure according to claim 1, wherein the two additional walls are unfolded.

3. The structure according to claim 1, wherein a length of the two additional walls is larger than a diameter of a punching and smaller than or equal to a length of a side of a honeycomb cell of the honeycomb core.

4. The structure according to claim 1, wherein the honeycomb joining and core cells are made from metal, an alloy, or a composite material.

5. The structure according to claim 1, further comprising a plurality of blocks with a honeycomb core defining a plurality of joint zones.

6. The structure according to claim 1, wherein the structure is single-layered and comprises another block joined on said at least one honeycomb core block.

7. A structural panel for a turbojet engine nacelle, comprising at least one honeycomb core structure according to claim 1.

8. The panel according to claim 7, wherein the panel comprises an acoustic panel.

9. A jet engine nacelle comprising a structural panel according to claim 7.

10. A method for making a honeycomb core structure according to claim 1, comprising:
    A—forming at least one additional wall on lateral honeycomb cells of at least one block with a honeycomb core defining two lateral parts surrounding a central part;
    B—at least partially superimposing the additional walls on the honeycomb joining cells belonging to two separate lateral parts;
    C—joining the honeycomb core block(s) by punching the additional walls thus superimposing via a punching means to form the honeycomb core structure.

11. The method according to claim 10, wherein, in step A, the additional wall(s) are formed by cutting, substantially crosswise, a block with a honeycomb core whereof the honeycomb cells are expanded.

12. The method according to claim 10, wherein, in step B, the additional walls are superimposed when the honeycomb joining and/or core (7a, 7b) cells are not expanded.

13. The method according to claim 10, wherein, in step C, the punching means is eyeletting pliers.

* * * * *